United States Patent [19]
Pinault et al.

[11] Patent Number: 5,640,675
[45] Date of Patent: Jun. 17, 1997

[54] METHOD AND SYSTEM FOR REDUCING THE TIME FOR CONNECTING A MOBILE TO A CELLULAR BASE STATION

[75] Inventors: Francis Pinault, Bois Colombes; Christophe Jouin, Paris, both of France

[73] Assignee: Alcatel Mobile Phones, Paris, France

[21] Appl. No.: 582,961

[22] Filed: Jan. 4, 1996

[30] Foreign Application Priority Data

Jan. 5, 1995 [FR] France ................... 95 00068

[51] Int. Cl.$^6$ ............................................ H04B 7/26
[52] U.S. Cl. .................... 455/33.1; 455/54.1; 455/62; 455/166.2
[58] Field of Search .................. 455/33.1, 33.4, 455/34.1, 54.1, 54.2, 56.1, 62, 67.1, 161.1, 161.2, 161.3, 186.1, 166.1, 166.2; 379/58, 59

[56] References Cited

U.S. PATENT DOCUMENTS

| | | | |
|---|---|---|---|
| 5,189,413 | 2/1993 | Gaskill et al. | 455/161.1 |
| 5,517,677 | 5/1996 | Moon | 455/161.1 |

FOREIGN PATENT DOCUMENTS

3200965A1  7/1983  Germany .

OTHER PUBLICATIONS

Mouly et al, "GSM System for Mobile Communications", *Europe Media*, 1993, pp. 456–458.

*Primary Examiner*—Reinhard J. Eisenzopf
*Assistant Examiner*—Lester G. Kincaid
*Attorney, Agent, or Firm*—Sughrue, Mion, Zinn, Macpeak & Seas

[57] ABSTRACT

Periodically, when a mobile is in its normal mode of operation, a first list of control frequencies transmitted by respective base stations of the geographical area in which the mobile is located is stored in a SIM card and a second list of control frequencies and associated respective maximal second receive levels measured by the mobile is stored in RAM. In response to being switched on, the mobile measures a first receive level for each of the control frequencies defined in the network and a comparator compares the first and second receive levels for each of the control frequencies of the second list, to assess movement of the mobile. To synchronize to a given network constituting a subnetwork of the radio communication network, the mobile uses the control frequencies defined in the radio communication network or the control frequencies from the first list, respectively, according to whether the mobile has moved or not.

8 Claims, 2 Drawing Sheets

METHOD AND SYSTEM FOR REDUCING THE TIME FOR CONNECTING A MOBILE TO A CELLULAR BASE STATION

BACKGROUND OF THE INVENTION

1. Field of the Invention

The present invention concerns a method and system for reducing the duration of a phase for connecting a mobile to a base station in a cellular mobile radio network, typically in response to switching on or resetting the mobile.

2. Description of the Prior Art

In a cellular mobile radio network of the GSM (Global System for Mobile communications) or DCS-1800 type a mobile measures a receive level, typically a power level, for each frequency of the spectrum of the radio communication network concerned, for example in response to being switched on. In a GSM network there are 124 frequencies and in a DCS-1800 network there are 374 frequencies. A control frequency is associated with each cell or the corresponding base station of a network of this kind. This frequency is transmitted continuously in TDMA mode and conveys various data including synchronization data and network identification data, or PLMN data, in a particular time slot, known as the active time slot, typically time slot 0, in the downlink frame transmitted from a cell base station to the mobiles. Various networks co-exist within the same geographical area and constitute sub-networks of a common radio communication network such as a GSM radio communication network. A given user subscribes to one of these networks, known as the user's home PLMN, to use the GSM terminology. The various networks are managed by respective operators who are allocated particular frequency bands.

In a first prior art technique for connecting a mobile to a base station, for example in response to being switched on the mobile initially measures a receive level for each control frequency in the spectrum associated with the radio communication network in question; then, in decreasing received level order, it synchronizes to the active time slot to receive the PLMN data conveyed by the control frequency and thus identify the network of which the cell generating the control frequency is a part. The mobile carries out these operations in order to connect to a base station that meets both the following conditions: a) the station is part of the user's home PLMN, and b) it generates a control frequency received at a high level by the mobile.

In a second prior art technique described in "The GSM System for Mobile Communications" produced and published by M. MOULY and M. B. PAUTET, 1992 edition, pages 457–458—Cell Selection at Switch-On Time—and page 464, advantage is taken of the fact that a mobile switched off at a given location may be switched on again at the same location. Using this second technique, when the mobile is active and connected to a base station a list of control frequencies of the user's home PLMN transmitted by respective base stations in a geographical area containing the mobile is stored periodically in a non-volatile memory in the mobile. This non-volatile memory is typically a memory on the removable smart card SIM (Subscriber Identity Module) and the list of control frequencies is a list broadcast by the user's home PLMN. This list, transmitted on the control frequency of the base station to which the mobile is connected, indicates the control frequencies produced by the base stations of the network adjacent the base station to which the mobile is connected. Using this technique, during connection of the mobile, for example in response to being switched on the mobile carries out two successive procedures.

In the first procedure the mobile classifies the control frequencies in the list of control frequencies stored on the SIM card, in decreasing receive level order, using receive level measurements for each frequency of the spectrum carried out by the mobile when it is switched on. For each control frequency in the list of control frequencies, and in decreasing receive level order, the mobile synchronizes iteratively to each of them until it receives, in the data carried by each frequency from the list, a PLMN code identifying the user's home PLMN, in order to receive the PLMN data. This first procedure reduces the time to connect the mobile to the network if the mobile has not moved any significant distance between being switched off and switched on again. In this case the small number of control frequencies in the list, compared to the total number of control frequencies in the radio communication network, significantly reduces the time to connect the mobile. If the mobile has moved a significant distance, then its synchronization is imperfect and must be repeated. Synchronization is "perfect" if it is to the network base station nearest the mobile.

If the first procedure cannot connect the mobile to a base station of the user's home PLMN and generating a control frequency received at a sufficiently high level by the mobile, then the second procedure is carried out, and uses the first of the prior art techniques referred to above. For each control frequency in the spectrum of the radio communication network, and in decreasing received level order, the mobile synchronizes to the active time slot in order to receive the PLMN data and thus to identify the network of which the cell generating that control frequency is a part.

Accordingly, the reduced time to connect the mobile to a base station of the user's home PLMN resulting from the use of a shortened list of control frequencies selected from all the frequencies of the spectrum is effective only if the mobile has not moved significantly between being switched off and being switched on again. Otherwise, i.e. if the mobile has moved significantly, the duration of the first procedure based on the use of a shortened list of control frequencies, as described above, delays the connection of the mobile to a base station, compared to direct and immediate attempts to synchronize to all the frequencies of the spectrum, as in the first prior art technique.

The invention is directed to remedying this drawback by providing methods and systems for reducing the time to connect a mobile to a base station in a cellular mobile radio network, for example in response to switching on the mobile. These methods and systems reduce the time to connect a mobile to a network base station even if the mobile has moved between being switched off and being switched on again.

SUMMARY OF THE INVENTION

To this end, in a first aspect, the invention consists in a method for reducing the duration of a phase for connecting a mobile to a base station of a given network constituting a subnetwork of a radio communication network, the method comprising:

(a1) storing a first list of control frequencies transmitted by respective base stations of a geographical area in which the mobile is located, and (b1) during the connection phase, measurement by the mobile of a respective first receive level for each of the control frequencies defined in the radio communication network, (a2) storing a second list of control frequencies and second receive levels respectively associated with the control frequencies of the second list and measured by the mobile, the second levels corresponding to maximal power levels received by the mobile, and (b2) during the connection phase, comparing the first and second receive levels for each of the control frequencies from the second list, which comparison has two possible outcomes:

if for each of the control frequencies of the second list the first and second receive levels are substantially identical, synchronization of the mobile to the control frequency from the first list having the highest first receive level, if for at least one of the control frequencies from the second list the first and second receive levels are significantly different, synchronization of the mobile to each of the control frequencies defined in the radio communication network, in decreasing first receive level order, until the mobile receives data conveyed by one of all the control frequencies defined in the radio communication network which identifies the one control frequency as being generated by a base station of the given network.

The first list of control frequencies transmitted by respective base station of a geographical area in which the mobile is located is typically transmitted periodically by the given network and received by the mobile when it is connected to a base station of that given network.

In a preferred embodiment the first list is stored in a memory of a removable medium that can be plugged into the mobile and the second list is stored in a random access memory included in the mobile and powered even when the mobile is switched off.

The invention also consists in a mobile for implementing the method, comprising a transmit/receive processing subsystem for measuring respective receive levels for receive control frequencies and a memory for storing respective first receive levels of the control frequencies defined in the radio communication network, a comparator for comparing the first and second receive levels for each of the control frequencies from the second list, the respective second receive levels for the control frequencies from the second list being stored in a non-volatile memory of the mobile, and means in the subsystem for:

synchronizing the mobile to the control frequency from the first list that is associated with the highest first receive level if for each of the control frequencies from the second list the first and second receive levels are substantially identical, and synchronizing the mobile to each of the control frequencies defined in the radio communication network, in decreasing first receive level order, until the mobile receives data conveyed by one of all the control frequencies defined in the radio communication network which identifies the one control frequency as being that generated by a base station of the given network if, for at least one of the control frequencies from the second list, the first and second receive levels are significantly different.

In a second aspect, the invention consists in a method for reducing the duration of a phase for connecting a mobile to a base station of a given network constituting a subnetwork of a radio communication network, the method comprising:

during the connection phase, measurement by the mobile of a respective first receive level for each of the control frequencies defined in the radio communication network, storing a list of control frequencies each associated with a respective second receive level measured by the respective mobile and a respective synchronization code, the second levels corresponding to maximal power levels received by the mobile, and during the connection phase, comparison of the first and second receive levels for each of the control frequencies from the list, which comparison has two possible outcomes:

if for each of the control frequencies from the list the first and second receive levels are substantially identical, synchronization of the mobile to the control frequency from the list with the highest receive level, based on the synchronization code associated with that control frequency from the first list having the highest receive level, if, for at least one of the control frequencies from the list, the first and second receive levels are significantly different, synchronization of the mobile to each of all the control frequencies defined in the radio communication network, in decreasing first receive level order, until the mobile receives data conveyed by one of all the control frequencies defined in the radio communication network that identifies the one control frequency as being generated by a base station of the given network.

Other features and advantages of the present invention emerge more clearly from a reading of the following description with reference to the appended drawings.

DETAILED DESCRIPTION OF THE PREFERRED EMBODIMENTS

Figure 1:
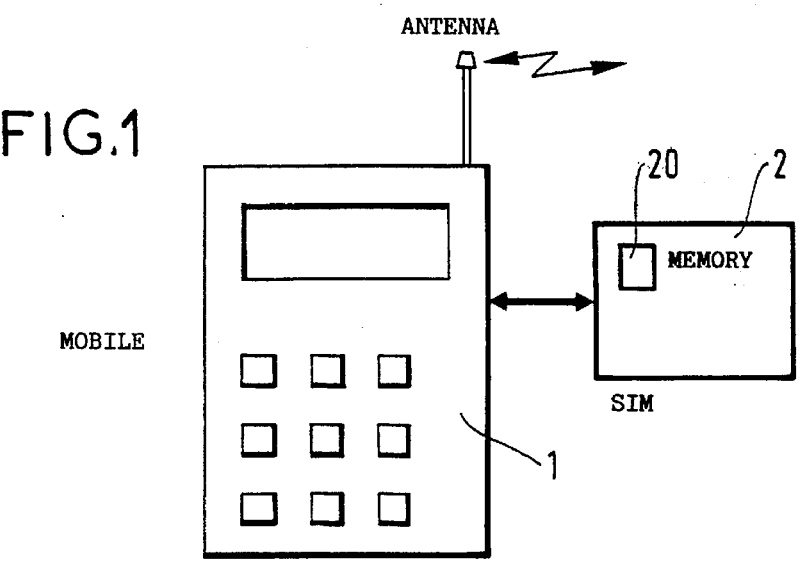
FIG. 1 shows a radio communication mobile and an associated subscriber identification module for storing a first list of control frequencies.

Referring to FIG. 1, a mobile 1 in a GSM type mobile radio network is used in conjunction with a subscriber identification (SIM) module or card 2. The module 2 comprises a memory 20 for storing various types of data, such as data used to configure the mobile 1. The module 2 typically plugs into a slot provided for this purpose in the mobile 1 so that data can be read from and written to the memory 20 by a read/write circuit included in the mobile 1. When the mobile 1 is switched on, in its normal operating mode, it periodically updates a list of control frequencies in the memory 20. At any given time this first list comprises the control frequencies of the user's home PLMN transmitted by respective base stations in a geographical area in which the mobile is currently located. This first list varies as the mobile moves around (when switched on) and each update is in response to a particular message transmitted by the base station to which the mobile 1 is connected. The list of control frequencies is typically defined by the set of control frequencies of the location area of the mobile, to use the GSM terminology.

As the memory 20 on the SIM card is a non-volatile memory, if the mobile 1 is switched off or reset the shortened list of frequencies stored in the memory 20 and comprising the control frequencies transmitted by respective base stations near the mobile 1 when it is switched off is saved. In the prior art technique, when the mobile 1 is subsequently switched on again, it starts by measuring the level at which it receives each frequency in the spectrum of the radio communication network, for example the GSM or DCS-1800 network. The mobile then classifies in decreasing receive level order all the control frequencies from the first list of control frequencies stored on the SIM card, using these initial receive level measurements. For each control frequency from the first list of control frequencies received at a sufficiently high level, and in decreasing receive level order, the mobile synchronizes iteratively until it receives, in the data conveyed by each frequency from the list, a PLMN code identifying the user's home PLMN, in order to receive PLMN data. If this procedure fails to connect the mobile to a base station of the user's home PLMN, the mobile synchronizes iteratively until it receives, in the data conveyed by each frequency from the spectrum, a PLMN code identifying the user's home PLMN, also using the initial receive level measurements. To this end, for each of all possible control frequencies of the spectrum, in decreasing receive level order, the mobile synchronizes to the active time slot in order to receive the PLMI data and therefore identify the network of which the cell generating that control frequency is a part.

The attempt by the mobile 1 when switched on to synchronize to data conveyed by frequencies in the list of control frequencies stored in the SIM card can lead to an unnecessary waste of time in connecting the mobile 1 to a base station if the mobile 1 has moved between being switched off and being switched on again.

Figure 2:
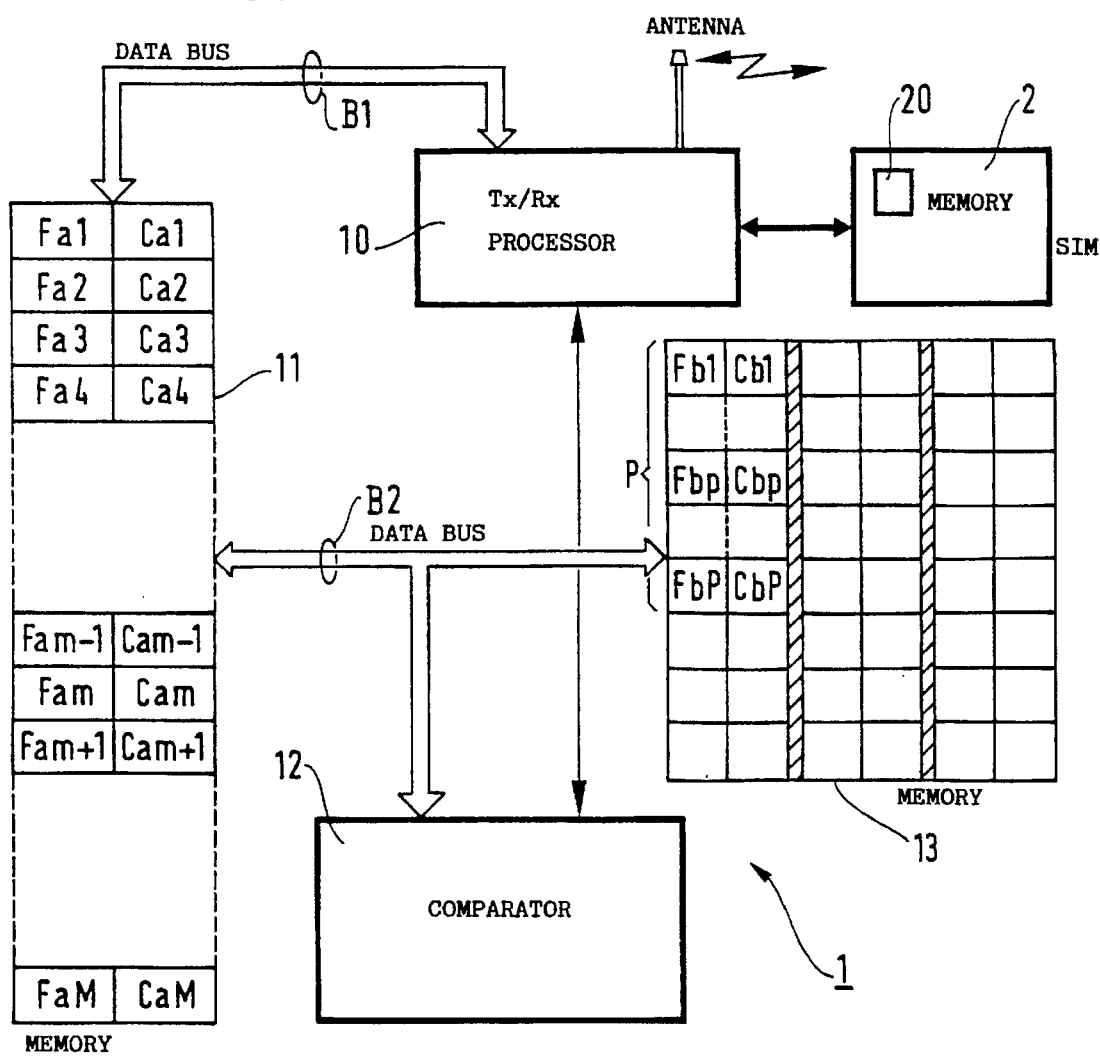
FIG. 2 is a block diagram of a first embodiment of the system in accordance with the invention for reducing the time to connect a mobile to a base station.

Referring to FIG. 2, a system for implementing the method of the invention, included in the mobile 1, comprises in the usual way a transmit/receive processing subsystem 10, a memory 11 for storing a list (Fam, Cam), with between 1 and M (M=124 in the GSM system and M=374 in the DCS-1800 system), of all the frequencies Fam in the spectrum of the radio communication network concerned and the associated respective receive levels Cam measured when the mobile 1 is switched on. The level at which a control frequency is received is measured by the subsystem 10. In accordance with the invention, the system further includes a comparator 12 and a memory 13 for storing a second list of P control frequencies and the associated respective receive levels measured by the mobile 1. In accordance with the invention, like the first list of control frequencies stored in the SIM card, the second list is updated periodically by the mobile 1 in the memory 13 while the mobile is switched on and in its normal operating mode. At any given time this second list is made up of control frequencies Fbp and associated respective receive levels Cbp transmitted by respective base stations of the network and received at a high level by the mobile 1. In practise the number P of control frequencies in the second list is small, for example 6, compared to the number of control frequencies in the first list, which is typically 32. The second list varies as the mobile moves around and is updated by the mobile itself as a result of listening to control frequencies transmitted by base stations neighboring the base station to which it is currently connected. The second list further includes the control frequency and the associated receive level transmitted by the base station to which the mobile is currently connected. The memory 13 is an area of RAM that is powered even if the mobile 1 is switched off, to save the second list of control frequencies and the associated respective receive levels.

If the mobile 1 is switched off or reset, the subsystem 10 measures a respective receive level for each control frequency in the spectrum of the radio communication network. The measurement results are passed to the transmit/receive processing system 10 over a bus B1 to be stored in the memory 11 in the form of a list of all possible control frequencies of the spectrum and the associated respective receive levels. The comparator 12 is connected to the memory 11 and to the memory 13 by a bus B2. For the set of P frequencies Fbp in the second list, which constitutes a subset of the M frequencies of the spectrum, the comparator 12 compares, for each of the P control frequencies from the second list, the (first) receive level Cam measured by the mobile 1 in response to being switched on and stored in the list 11 with the (second) receive level Cbp corresponding to this frequency of the spectrum in the second list and measured by the mobile 1 before it was switched off in its normal operating mode. There are two possible outcomes of this comparison. The subsystem 10 is connected to the comparator 12 to enable them to exchange control data.

If for at least one of the control frequencies from the second list the first and second receive levels are significantly different, the mobil 1 synchronizes to each of the control frequencies of said network in decreasing first receive level order until it receives data carried by one of the control frequencies identifying that control frequency as being the one generated by a base station of the user's home PLMN.

If the first and second receive levels are substantially identical for all of the control frequencies from the second list the mobile synchronizes to the control frequency from the first list associated with the highest measured first receive level. This control frequency is necessarily the control frequency actually received by the mobile at the highest level when it is switched on, given that the mobile has not moved since it was switched off.

The connection between the subsystem 10 and the comparator 12 enables the comparator 12 to control synchronization means in the subsystem 10 according to the comparison results.

If the first and second receive levels are substantially identical for each of the P control frequencies from the second list there is a very high probability that the mobile has not moved between being switched off and switched on again. In this case using the first list stored in the memory of the SIM card 2 will save time in connecting the mobile 1 to a base station.

If the first and second receive levels are significantly different for at least one of the control frequencies from the second list, it can be deduced that the mobile has moved between being switched off and being switched on again. In this case using the first list stored in the memory of the SIM card 2 is not the optimum given that this use leads to a high probability of wasting time in connecting the mobile to a base station. The mobile has moved between being switched off and being switched on again and the duration of the processing operations, such as classifying the frequencies by receive level for all the control frequencies in the first list stored in the SIM card, can unnecessarily lengthen the time to connect the mobile to the network. It must be remembered that the number of control frequencies in the second list is very much smaller than the number of control frequencies in the first list.

Note also that, in accordance with the invention, the first and second receive levels are respectively significantly different or substantially identical if they differ from each other such that the higher of the two levels is greater than the lower level by a percentage at least or at most equal to a threshold percentage. This threshold percentage is between 10% and 30%, for example.

Figure 3:
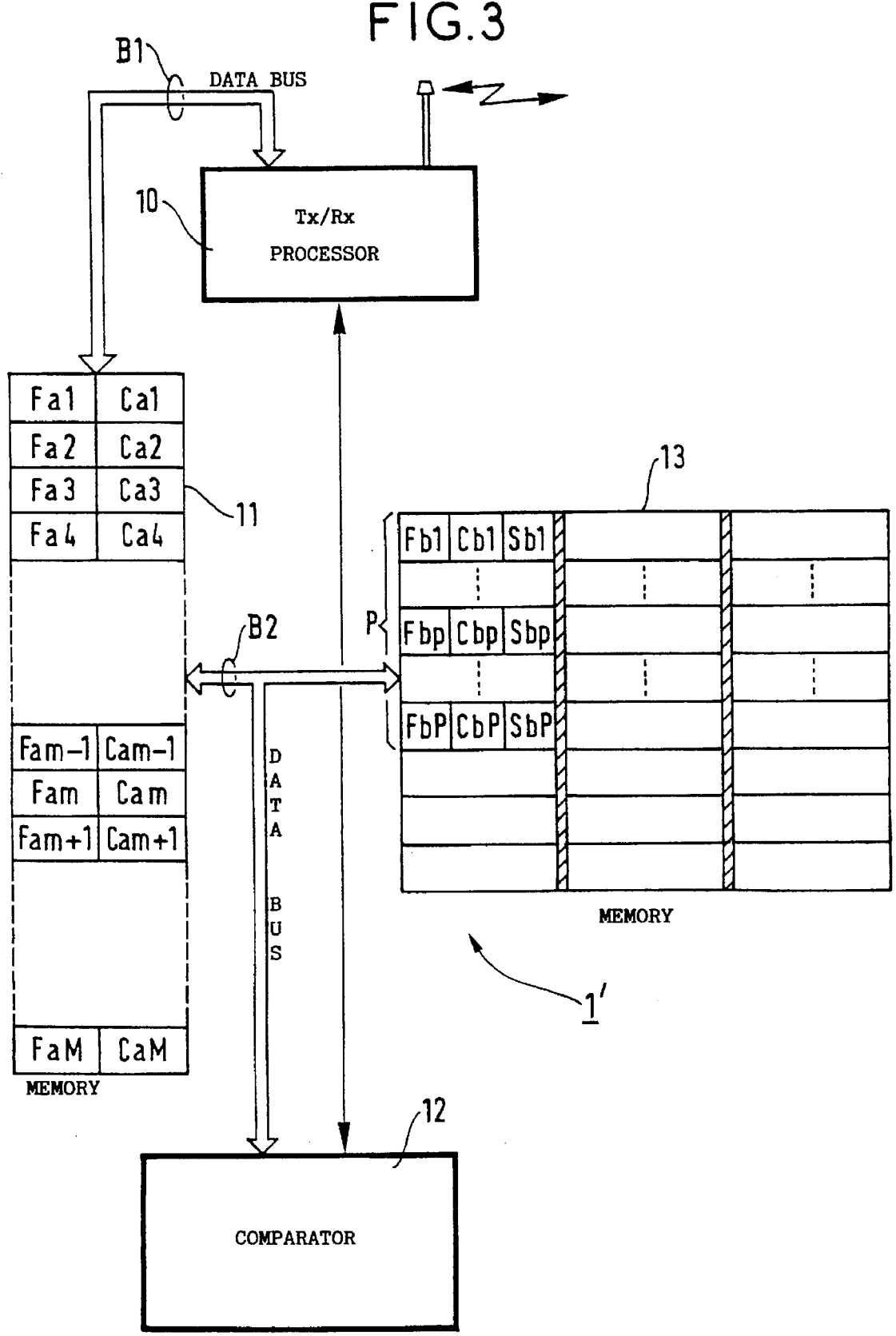
FIG. 3 is a block diagram of a second embodiment of the system in accordance with the invention for reducing the time to connect a mobile to a base station.

A variant of FIG. 2, FIG. 3 proposes a system 1' for an advantageous implementation of the invention. The system comprises the transmit/receive processing subsystem 10, the memory 11 for storing a list (Fam, Cam), with m between 1 and M (M=124 in the GSM system and M=374 in the DCS-1800 system) of all the frequencies Fam in the spectrum of the radio communication network concerned and the associated respective receive levels Cam measured when the mobile 1 is switched on, the comparator 12 and the memory 13. In this embodiment the memory 13 stores a list of P control frequencies Fbp each associated with a receive level Cbp measured by the mobile and a synchronization code Sbp, p varying between 1 and P. All the circuits 10, 11, 12 and 13 are identical to and operate in the same way as their counterparts in FIG. 2. The subsystem 10 and the comparator 12 are connected to enable the comparator 12 to control the synchronization means in the subsystem 10 according to the comparison results. This embodiment does not use the SIM card to implement the invention.

As in the FIG. 2 embodiment, the number P of control frequencies in the list in the memory 13 is small, for example 6. This list varies as the mobile moves around (when switched on) and is updated by the mobile itself as a result of listening to control frequencies transmitted by base stations neighboring the base station to which the mobile is currently connected. It further includes the control frequency transmitted by the base station to which the mobile is currently connected and the associated receive level and the synchronization code. The memory 13 is an area in RAM that is powered even if the mobile 1 is switched off, so that the list of control frequencies in the memory 13 is saved, together with the respective receive levels and synchronization data associated therewith.

When the mobile 1 is switched on or reset the subsystem 10 measures a respective receive level for each of the control frequencies of the spectrum of the radio communication network. The measurement results are transferred to the transmit/receive processing subsystem 10 over the bus B1 to be stored in the memory 11 in the form of a list of all possible control frequencies in the spectrum and the associated respective receive levels. The comparator 12 is connected to the memory 11 and to the memory 13 by a bus B2. For all the P frequencies Fbp of the list in the memory 13, which constitutes a subset of all the M frequencies in the spectrum, the comparator 12 compares, for each of the P control frequencies in that list, the (first) receive level Cam measured by the mobile 1 in response to being switched on and stored in the list 11 and the (second) receive level Cbp corresponding to this frequency of the spectrum in the list and measured by the mobile 1 before it was switched off in its normal operating mode. There are two possible outcomes of this comparison.

If for at least one control frequency Fbp from the list the first and second receive levels are significantly different, the mobile 1 synchronizes to each of the control frequencies defined in said radio communication network, in decreasing first receive level order, until it receives data conveyed by one of the control frequencies identifying that control frequency as being generated by a base station of user's home PLMN.

If for each of the control frequencies from the list the first and second receive levels are substantially identical, the mobile synchronizes to the control frequency Fbp, being between 1 and P, from the list associated with the highest measured first receive level. This control frequency is necessarily the control frequency actually received at the highest level by the mobile when it is switched on, given that the mobile has not moved since it was switched off. Synchronization of the mobile to the control frequency Fbp is optimized according to the synchronization code Sbp associated with that frequency Fbp. For example, the code Sbp comprises a Base Station Identity Code (BSIC), to use the GSM terminology. Conveyed in the conventional manner in a synchronization channel SCH transmitted by each base station, a mobile uses the BSIC, as in the prior art, to discriminate between different base stations transmitting the same control frequency in a small geographical area. In accordance with the invention, the code Sbp is stored in the list in the memory 13 in association with a respective frequency Fbp from the list and is used to speed up synchronization of the mobile by enabling fast selection by the mobile of the base station identified by this code in the event that more than one nearby base station is transmitting the same control frequency. In the case of the second alternative mentioned above, the mobile synchronizes to the control frequency Fbp, p being between 1 and P, from the list in the memory 13 associated with the highest measured first receive level. This control frequency Fbp may correspond to more than one neighboring base station and the synchronization code Sbp is used in the mobile, in accordance with the invention, during the synchronization phase to select quickly that of the base stations which corresponds to the base station whose control frequency Fbp is stored in the memory 13. This reduces the time to connect the mobile 1' to a base station. The data Sbp can be in some other form, in practise, such as a propagation time difference.

There is claimed:

1. A method for reducing the duration of a phase for connecting a mobile to a base station of a given network constituting a subnetwork of a radio communication network, said method comprising the steps of:

(a1) storing a first list of control frequencies transmitted by respective base stations of a geographical area in which the mobile is located, and (b1) measuring, by the mobile during the connection phase, a respective first receive level for each of the control frequencies defined in said radio communication network, (a2) storing a second list of control frequencies and second receive levels respectively associated with said control frequencies of said second list and measured by said mobile, said second levels corresponding to maximal power levels received by said mobile, (b2) during said connection phase, comparing said first and second receive levels for each of said control frequencies from said second list, synchronizing said mobile to said control frequency from said first list having the highest first receive level if for each of said control frequencies of said second list said first and second receive levels are substantially identical, and synchronizing said mobile to each of the control frequencies defined in said radio communication network, in decreasing first receive level order, until said mobile receives data conveyed by one of all said control frequencies defined in said radio communication network which identifies said one control frequency as being generated by a base station of said given network, if for at least one of said control frequencies from said second list said first and second receive levels are significantly different.

2. The method according to claim 1 wherein said first list of control frequencies transmitted by respective base stations of a geographical area in which said mobile is located is transmitted periodically by said given network and received by said mobile when it is connected to a base station of that given network.

3. The method according to claim 1 wherein said first list is stored in a memory of a removable medium that can be plugged into said mobile.

4. The method according to claim 1 wherein said second list is stored in a random access memory included in said mobile and powered even when said mobile is switched off.

5. A mobile for implementing a method for reducing the duration of a phase for connecting said mobile to a base station of a given network constituting subnetwork of a radio communication method, said method comprising the steps of storing a first list of control frequencies transmitted by respective base stations of a geographical area in which the mobile is located, measuring a respective first receive level for each of the control frequencies defined in said radio communication network, storing a second list of control frequencies and receive second levels respectively associated with said control frequencies of said second list and measured by said mobile, said second levels corresponding to maximal power levels received by said mobile, comparing said first and second receive levels during said connection phase for each of said control frequencies from said second list, and synchronizing said mobile to a control frequency based on the results of said comparison, said mobile comprising:

a transmit/receive processing subsystem for measuring respective receive levels for received control frequencies and a memory for storing respective first receive levels of said control frequencies defined in said radio communication network, a comparator for comparing said first and second receive levels for each of said control frequencies from said second list, said respective second receive levels for said control frequencies from said second list being stored in a non-volatile memory of said mobile, and means in said subsystem for:

synchronizing said mobile to the control frequency from said first list that is associated with the highest first receive level if for each of said control frequencies from said second list said first and second receive levels are substantially identical, and synchronizing said mobile to each of said control frequencies defined in said radio communication network, in decreasing first receive level order, until said mobile receives data conveyed by one of all said control frequencies defined in said radio communication network which identifies said one control frequency as being that generated by a base station of said given network if, for at least one of said control frequencies from said second list, said first and second receive levels are significantly different.

6. A method for reducing the duration of a phase for connecting a mobile to a base station of a given network constituting a subnetwork of a radio communication network, said method comprising the steps of:

measuring, by said mobile during said connection phase, a respective first receive level for each of the control frequencies defined in said radio communication network, storing a list of control frequencies each associated with a respective second receive level measured by said mobile and a respective synchronization code, said second levels corresponding to maximal power levels received by said mobile, during said connection phase, comparing said first and second receive levels for each of said control frequencies from said list, synchronizing said mobile to the control frequency from the list with the highest receive level, based on the synchronization code associated with the control frequency from said list having the highest receive level, if for each of said control frequencies from said list said first and second receive levels are substantially identical, and synchronizing said mobile to each of all the control frequencies defined in said radio communication network, in decreasing first receive level order, until said mobile receives data conveyed by one of all said control frequencies defined in said radio communication network that identifies said one control frequency as being generated by a base station of said given network, if, for at least one of said control frequencies from said list, said first and second receive levels are significantly different.

7. The method according to claim 6 wherein said synchronization code comprises a base station identification code.

8. The method according to claim 6 wherein said list is stored in a random access memory included in said mobile and which is powered even when said mobile is switched off.

* * * * *